UNITED STATES PATENT OFFICE.

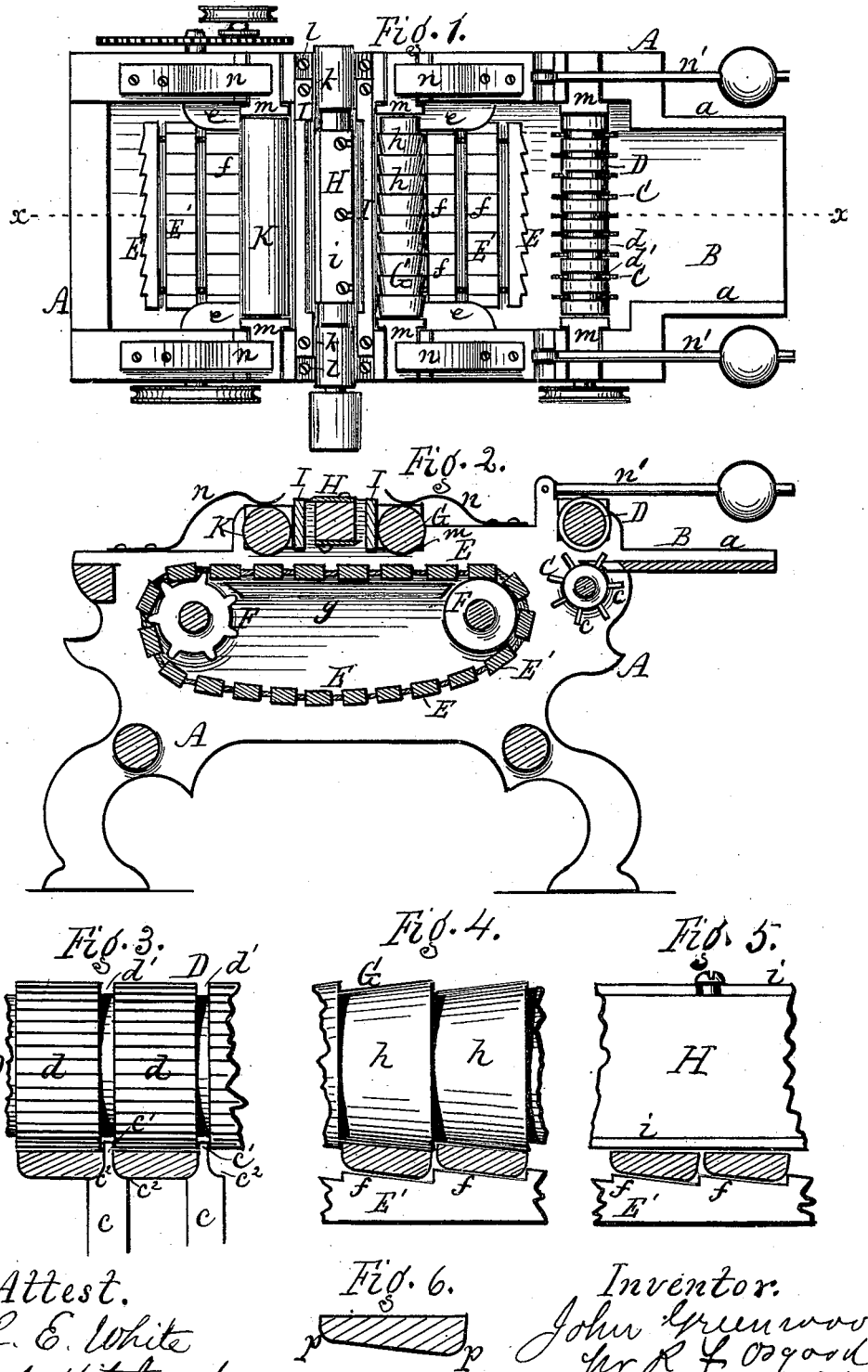

JOHN GREENWOOD, OF ROCHESTER, NEW YORK.

IMPROVEMENT IN MACHINES FOR MAKING HOOPS.

Specification forming part of Letters Patent No. 199,056, dated January 8, 1878; application filed September 29, 1877.

*To all whom it may concern:*

Be it known that I, JOHN GREENWOOD, of the city of Rochester, in the county of Monroe and State of New York, have invented a certain new and useful Improvement in Machines for Cutting and Planing Hoops; and I do hereby declare that the following is a full, clear, and exact description of the construction and operation of the same, reference being had to the accompanying drawings, in which—

Figure 1 is a plan of the machine. Fig. 2 is a vertical section in line $x\,x$ of Fig. 1. Figs. 3, 4, and 5 are detail views, showing the method of cutting the hoops, feeding them forward, and planing them. Fig. 6 is a cross-section of one of the finished hoops.

My improvement relates to machines for cutting or splitting hoops from staves or strips properly prepared, and then planing the upper surface to form a bevel in cross-section.

The invention consists in the construction and arrangement of parts, hereinafter more fully described and definitely claimed.

A represents a frame of any convenient form. B is a bed or table, upon which the stuff is placed to be fed into the machine. It has, preferably, two side ledges, $a\,a$, which form guides to the stuff as it enters. The material from which the hoops are made is first cut into sections, like staves, of proper thickness to make the width of a hoop, and of such width as to make several thicknesses of hoops. C C C are a series of cutters or saws at the inner end of the table, which are placed the right distance apart to cut the hoops. Where square-edged hoops are to be cut, saws or plain cutters may be employed; but where the corners of the hoops are to be rounded, as shown at $p\,p$, Fig. 6, knives $c\,c$, having a projecting end, $c^1$, to split the hoop, and concave faces $c^2\,c^2$, Fig. 3, to cut the rounds of the edges, are employed, being attached to the cutter-heads C C. Or, if desired, saws or plain cutters may be employed for this purpose, with extra side cutters connected therewith for producing the rounds.

It will be seen that the cutters not only split or divide the hoop of proper size preparatory to planing, but also round off and dress the corners, leaving them perfectly smooth and in a finished condition. The curves $c^2\,c^2$ are of unequal size on opposite sides, to correspond with the bevel of the hoop to be formed.

D is a roller, or a series of rollers, placed directly above the cutters or saws. It is formed with a series of rings, $d$, which are corrugated, and bear upon the stuff to feed it through, and an intermediate series of grooves, $d'\,d'$, into which the upper ends of the cutters or saws strike as they slit the stuff. This is shown most clearly in Fig. 3, which is a front elevation of the feed-roller and cutters, showing two of the hoops passing through.

E is an endless apron, composed of a series of lags, E' E', suitably jointed together, and passing around driving-wheels F F' at opposite ends, one of which is a sprocket-wheel for giving motion to the apron. The upper surfaces of these lags are formed with a series of inclined planes, $f\,f$, corresponding in position and number with the cutters for slitting the stuff.

As soon as the hoops leave the cutters they fall upon the inclined planes $f\,f$, and assume the angular position shown in Fig. 4—one edge being placed higher than the other—and in this condition they are fed through the machine. The ends of the lags pass beneath guides $e\,e$, Fig. 1, and over other guides, $g\,g$, Fig. 2, so that the body of the apron, which forms the working portion beneath the planing-cutter and the rollers, is always sustained in rigid and firm position, and cannot spring under the strain.

G is a roller, consisting of a series of cones, $h\,h$, which roller is placed in a suitable position over the endless apron. The cones correspond in number and position with the inclined planes of the apron below, and the inclines of the cones and the planes are parallel, so that the hoops lying between them, as shown in Fig. 4, are held firmly on both faces. The roller G serves the double purpose of holding the hoops down to the work, and of feeding them through to the planer.

H is the planing-cutter, located in the rear of the roller. It is simply an ordinary planer-head for doing straight work, having straight knives $i\,i$. The planer is set in a horizontal line, and as the inclined hoops pass beneath it the raised corners of the hoops are planed off to a straight line, forming the hoops of the bevel form shown in Fig. 6. The planed surface is left perfectly smooth and finished.

I I are two spring presser-bars, located on opposite sides of the planer, to hold the hoops steady while under the action of the planer; and K is a feeding-roller in the rear, for drawing the hoops through and discharging them over the tail end of the machine. The spring presser-bars are adjustable both up and down by adjusting-screws $k$ $l$, in a well-known way, and the journals of the several rollers D G K rest in boxes $m$ $m$, adjustable upward by means of screws, and held down by springs $n$ $n$ or weights $n'$ $n'$. If desired, the planer may also be made adjustable vertically. By this means the machine is adapted to hoops of different thicknesses.

The advantages of this machine are, that hoops may be cut and planed at one operation, and in great quantity at once, and the hoops so produced are smoother, more perfectly finished, and are not shaken, split, or slivered, as is the case in ordinary practice where one hoop is planed at a time. They are also finished with rounded corners at one and the same operation.

Having thus described my invention, what I claim herein as new is—

1. In a hoop-machine, the cutter C, provided with knives $c$, having the slitting ends $c^1$, for dividing the hoops, and the concave faces $c^2$ $c^2$, for rounding the corners of the hoops, in combination with the pressing-roller D, resting above the cutters, as shown and described, and for the purpose specified.

2. In a hoop-machine, the combination of the endless apron or bed E, provided with the inclined planes $f$ $f$, the roller G, provided with the cones $h$ $h$, said planes and cones being parallel with each other to hold the hoops in an angular position, and the planer H, set in a horizontal or straight position, to plane the hoops to a bevel, as herein shown and described.

3. In a hoop-machine, the combination of the saws or cutters C C, the feeding-roller D, the endless apron E, provided with the inclined planes $f$ $f$, the pressing-roller G, provided with the cones $h$ $h$, and the straight planer H, the whole arranged as described, so that the hoops are first cut from staves or sections, then carried in an inclined position through the apron and pressing-roller, and finally planed to bevel form by the planer, as herein described.

4. The process herein described of forming hoops, which consists in first slitting or dividing the hoops and rounding the corners, then passing the hoops in an inclined position between a bed and roller, and planing off the raised corners by a straight planer, as herein specified.

In witness whereof I have hereunto signed my name in the presence of two subscribing witnesses.

JOHN GREENWOOD.

Witnesses:
  R. F. OSGOOD,
  R. E. WHITE.